United States Patent
Groshek (10) Patent No.: US 11,236,648 B2
(45) Date of Patent: Feb. 1, 2022

(54) CLIMATE-CONTROL SYSTEM HAVING OIL COOLING CONTROL SYSTEM

(71) Applicant: Emerson Climate Technologies, Inc., Sidney, OH (US)

(72) Inventor: Jacob A. Groshek, Troy, OH (US)

(73) Assignee: Emerson Climate Technologies, Inc., Sidney, OH (US)

( * ) Notice: Subject to any disclaimer, the term of this patent is extended or adjusted under 35 U.S.C. 154(b) by 217 days.

(21) Appl. No.: 16/252,035

(22) Filed: Jan. 18, 2019

(65) Prior Publication Data

US 2020/0157982 A1 May 21, 2020

Related U.S. Application Data (60) Provisional application No. 62/769,957, filed on Nov. 20, 2018.

(51) Int. Cl.
*F01M 1/02* (2006.01)
*F01M 1/16* (2006.01)
(Continued)

(52) U.S. Cl.
CPC ............ *F01M 1/02* (2013.01); *F01M 1/16* (2013.01); *F01M 11/0004* (2013.01);
(Continued)

(58) Field of Classification Search
CPC ...... F01M 1/02; F01M 11/04; F01M 11/0458; F01M 1/16; F01M 5/007; F01M 11/0004;
(Continued)

(56) References Cited

U.S. PATENT DOCUMENTS

| 4,516,916 | A | 5/1985 | English et al. |
| 5,013,225 | A | 5/1991 | Richardson, Jr. |

(Continued)

FOREIGN PATENT DOCUMENTS

| CN | 201297252 Y | 8/2009 |
| EP | 1698783 A1 | 9/2006 |

(Continued)

OTHER PUBLICATIONS

JP2007232230 translation (Year: 2021).*

(Continued)

*Primary Examiner* — Devon C Kramer
*Assistant Examiner* — David N Brandt
(74) *Attorney, Agent, or Firm* — Harness, Dickey & Pierce, P.L.C.

(57) ABSTRACT

A system may include a compressor, a first passageway, a valve and a control module. The compressor includes a compression mechanism operable to compress a working fluid. The first passageway is in fluid communication with an oil sump of the compressor and the compression mechanism. The valve is disposed along the first passageway and movable between an open position allowing lubricant from the oil sump to flow to the compression mechanism and a closed position restricting lubricant from the oil sump from flowing to the compression mechanism. The control module is in communication with the valve and configured to move the valve between the closed position and the open position based on an operating parameter indicative of a temperature of the compression mechanism.

12 Claims, 3 Drawing Sheets

(51) Int. Cl.
  *F01M 11/00* (2006.01)
  *F25B 49/02* (2006.01)
  *F04C 29/02* (2006.01)
  *F01M 11/04* (2006.01)
  *F16H 57/04* (2010.01)

(52) U.S. Cl.
  CPC ....... *F01M 11/0458* (2013.01); *F04C 29/021* (2013.01); *F04C 29/023* (2013.01); *F04C 29/028* (2013.01); *F25B 49/022* (2013.01); *F16H 57/0413* (2013.01)

(58) Field of Classification Search
  CPC ....... F01M 11/06; F01M 11/12; F04C 29/028; F04C 29/021; F04C 29/02; F04C 29/023; F16H 57/0413
  See application file for complete search history.

(56) References Cited

U.S. PATENT DOCUMENTS

| | | |
|---|---|---|
| 5,222,874 A | 6/1993 | Unnewehr et al. |
| 5,370,513 A | 12/1994 | Fain |
| 5,372,490 A | 12/1994 | Fain |
| 5,395,224 A | 3/1995 | Caillat et al. |
| 6,071,100 A | 6/2000 | Yamada et al. |
| 6,257,840 B1 | 7/2001 | Ignatiev et al. |
| 6,422,843 B1 | 7/2002 | Sun et al. |
| 6,616,415 B1 | 9/2003 | Renken et al. |
| 6,655,932 B1 | 12/2003 | Stinessen et al. |
| 7,878,780 B2 | 2/2011 | Bush et al. |
| 8,133,043 B2 | 3/2012 | Duppert |
| 8,215,933 B2 | 7/2012 | Kim et al. |
| 8,590,324 B2 | 11/2013 | Guo et al. |
| 8,961,158 B2 | 2/2015 | Oka et al. |
| 9,127,669 B2 | 9/2015 | Tsuka et al. |
| 9,239,054 B2 | 1/2016 | Ignatiev et al. |
| 9,903,370 B2 | 2/2018 | Tsuka et al. |
| 10,480,509 B2 | 11/2019 | Murakami et al. |
| 2009/0087320 A1 | 4/2009 | Tanaka et al. |
| 2009/0090117 A1* | 4/2009 | McSweeney ........... F25B 41/31 62/204 |
| 2010/0028165 A1 | 2/2010 | Kameya et al. |
| 2010/0098570 A1* | 4/2010 | Bodart ................. F04C 29/021 418/55.1 |
| 2012/0189472 A1 | 7/2012 | McDonald |
| 2012/0224990 A1* | 9/2012 | Shiibayashi ............. H02K 3/44 418/55.2 |
| 2013/0078131 A1 | 3/2013 | Ahn et al. |
| 2014/0053587 A1* | 2/2014 | Arii ....................... F25B 49/022 62/196.1 |
| 2014/0138451 A1* | 5/2014 | Pham ..................... F04B 39/06 237/12 |
| 2016/0298627 A1* | 10/2016 | Knippen ............... F25B 49/022 |
| 2016/0319816 A1* | 11/2016 | Brostrom ................ F04C 18/34 |

FOREIGN PATENT DOCUMENTS

| | | | |
|---|---|---|---|
| EP | 3604816 A1 | 2/2020 | |
| JP | H05172077 A | 7/1993 | |
| JP | 2007232230 | * 9/2007 | ............... F25B 1/00 |
| JP | 2011012629 A | 1/2011 | |
| JP | 2011012633 A | 1/2011 | |
| JP | 2014190271 A | 10/2014 | |
| WO | WO-2018174100 A1 | 9/2018 | |

OTHER PUBLICATIONS

CA Search Report regarding European Patent Application No. 19210166.5, dated Apr. 17, 2020.

"Application guidelines: Inverter scroll compressors VZH088-117-170 single, R410A." Danfoss Commercial Compressors, Jan. 2017, http://files.danfoss.com/technicalinfo/dila/17/FRCC.PC. 023.A8.02-VZH088-117-170-Jan2017.pdf.

International Search Report regarding Application No. PCT/US2013/067476, dated Feb. 11, 2014.

Written Opinion of the International Searching Authority regarding Application No. PCT/US2013/067476, dated Feb. 11, 2014.

Office Action regarding U.S. Appl. No. 14/063,056, dated Jun. 4, 2015.

Office Action regarding U.S. Appl. No. 14/063,056, dated Sep. 11, 2015.

Office Action regarding Chinese Patent Application No. 201380060605. 3, dated May 27, 2016. Translation provided by Unitalen Attorneys at Law.

U.S. Appl. No. 17/076,582, filed Oct. 21, 2020, Stephen M. Seibel et al.

* cited by examiner

CLIMATE-CONTROL SYSTEM HAVING OIL COOLING CONTROL SYSTEM

CROSS-REFERENCE TO RELATED APPLICATIONS

This application claims the benefit of U.S. Provisional Application No. 62/769,957, filed on Nov. 20, 2018. The entire disclosure of the above application is incorporated herein by reference.

FIELD

The present disclosure relates to a climate-control system having an oil cooling control system.

BACKGROUND

This section provides background information related to the present disclosure and is not necessarily prior art.

A climate-control system such as, for example, a heat-pump system, a refrigeration system, or an air conditioning system, may include a fluid circuit having an outdoor heat exchanger, one or more indoor heat exchangers, one or more expansion devices disposed between the indoor and outdoor heat exchangers, and one or more compressors circulating a working fluid (e.g., refrigerant or carbon dioxide) between the indoor and outdoor heat exchangers. Efficient and reliable operation of the one or more compressors is desirable to ensure that the climate-control system in which the one or more compressors are installed is capable of effectively and efficiently providing a cooling and/or heating effect on demand.

SUMMARY

This section provides a general summary of the disclosure, and is not a comprehensive disclosure of its full scope or all of its features.

In one form, the present disclosure provides a method for cooling a compression mechanism of a compressor. The method includes acquiring a first value of an operating parameter that is indicative of a temperature of a compression mechanism of a compressor; comparing the first value to a predetermined parameter value; providing lubricant from an oil sump of the compressor to the compression mechanism of the compressor if the first value is greater than the predetermined parameter value; and restricting lubricant from the oil sump to the compression mechanism if the first value is less than the predetermined parameter value.

In some configurations of the method of the above paragraph, lubricant is provided from the oil sump to the compression mechanism via a first fluid passageway if the first parameter value is greater than the predetermined parameter value.

In some configurations of the method of any one or more of the above paragraphs, the method further includes providing lubricant from the oil sump to the compression mechanism via a second passageway formed in a driveshaft of the compressor.

In some configurations of the method of any one or more of the above paragraphs, a portion of the first fluid passageway is disposed outside of a shell assembly of the compressor.

In some configurations of the method of any one or more of the above paragraphs, the operating parameter is a temperature of a discharge line of a climate-control system.

In some configurations of the method of any one or more of the above paragraphs, the operating parameter is a temperature of a discharge passage of the compressor.

In some configurations of the method of any one or more of the above paragraphs, the method further includes providing fluid to the compression mechanism by opening a valve and restricting fluid to the compression mechanism by closing the valve.

In some configurations of the method of any one or more of the above paragraphs, the method further includes acquiring a second value of the operating parameter and determining if the second value is greater than the predetermined parameter value.

In some configurations of the method of any one or more of the above paragraphs, the method further includes shutting down the compressor if the second value is greater than the predetermined parameter value.

In some configurations of the method of any one or more of the above paragraphs, the method further includes performing a system corrective action if the second value is greater than the predetermined parameter value. The system corrective action includes one or both of: adjusting a position of an expansion device and adjusting a speed of a blower motor.

In some configurations of the method of any one or more of the above paragraphs, the operating parameter is based on a saturated evaporator temperature, a saturated condenser temperature and a suction superheat (i.e., difference between the saturated temperature of the working fluid in the suction line and the actual temperature of the working fluid in the suction line).

In some configurations of the method of any one or more of the above paragraphs, a predetermined time period elapses between providing lubricant from the oil sump to the compression mechanism and acquiring the second value of the operating parameter if the first value is greater than the predetermined parameter value.

In another form, the present disclosure provides a climate-control system that may include a compressor, a first passageway, a valve and a control module. The compressor includes a compression mechanism operable to compress a working fluid. The first passageway is in fluid communication with an oil sump of the compressor and the compression mechanism. The valve is disposed along the first passageway and movable between an open position allowing lubricant from the oil sump to flow to the compression mechanism and a closed position restricting lubricant from the oil sump from flowing to the compression mechanism. The control module is in communication with the valve and configured to move the valve between the closed position and the open position based on an operating parameter indicative of a temperature of the compression mechanism.

In some configurations of the system of the above paragraph, a first value of the operating parameter is acquired from a sensor disposed at a discharge line of the compressor.

In some configurations of the system of any one or more of the above paragraphs, the control module is configured to move the valve from the closed position to the open position if a first value of the operating parameter is greater than a predetermined parameter value.

In some configurations of the system of any one or more of the above paragraphs, the control module is configured to maintain the valve in the closed position if the first value is less than the predetermined parameter value.

In some configurations of the system of any one or more of the above paragraphs, the compressor includes a driveshaft. Lubricant from the oil sump is provided to the compression mechanism via a second passageway formed in the driveshaft of the compressor. Lubricant flows through the second passageway during operation of a motor of the compressor regardless of whether the first value of the operating parameter is greater than the predetermined parameter value.

In some configurations of the system of any one or more of the above paragraphs, the control module is configured to shut down the compressor in response to a second value of the operating parameter being greater than the predetermined parameter value.

In some configurations of the system of any one or more of the above paragraphs, the control module is configured to perform a system corrective action in response to a second value of the operating parameter being greater than the predetermined parameter value.

In some configurations of the system of any one or more of the above paragraphs, a portion of the first passageway is disposed outside of a shell assembly of the compressor.

In some configurations of the system of any one or more of the above paragraphs, the compressor includes a motor driving the compression mechanism. The control module is configured to move the valve between the closed position and the open position independently of a speed of the motor.

In another form, the present disclosure provides a climate-control system including a compressor, a sensor, a passageway, a valve and a control module. The compressor includes a compression mechanism operable to compress a working fluid. The sensor is configured to measure an operating parameter of the system. The first passageway is in fluid communication with an oil sump of the compressor and the compression mechanism. The valve is disposed along the passageway and movable between an open position allowing lubricant from the oil sump to flow to the compression mechanism and a closed position restricting lubricant from the oil sump from flowing to the compression mechanism. The control module is in communication with the valve and the sensor, and configured to move the valve between the closed position and the open position based on the measured operating parameter.

In some configurations of the system of the above paragraph, the sensor is disposed at a discharge line of the compressor.

In some configurations of the system of any one or more of the above paragraphs, the control module is configured to move the valve from the closed position to the open position if a first measured value of the operating parameter is greater than a predetermined parameter value.

In some configurations of the system of any one or more of the above paragraphs, the control module is configured to maintain the valve in the closed position if the first measured value is less than the predetermined parameter value.

In some configurations of the system of any one or more of the above paragraphs, the compressor includes a driveshaft. Lubricant from the oil sump is provided to the compression mechanism via a second passageway formed in the driveshaft of the compressor. Lubricant flows through the second passageway during operation of a motor of the compressor regardless of whether the first measured value is greater than the predetermined parameter value.

In some configurations of the system of any one or more of the above paragraphs, the control module is configured to shut down the compressor in response to a second measured value of the operating parameter being greater than the predetermined parameter value.

In some configurations of the system of any one or more of the above paragraphs, the control module is configured to perform a system corrective action in response to a second measured value of the operating parameter being greater than the predetermined parameter value.

In some configurations of the system of any one or more of the above paragraphs, a portion of the first passageway is disposed outside of a shell assembly of the compressor.

In some configurations of the system of any one or more of the above paragraphs, the compressor includes a motor driving the compression mechanism. The control module is configured to move the valve between the closed position and the open position independently of a speed of the motor.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 1:
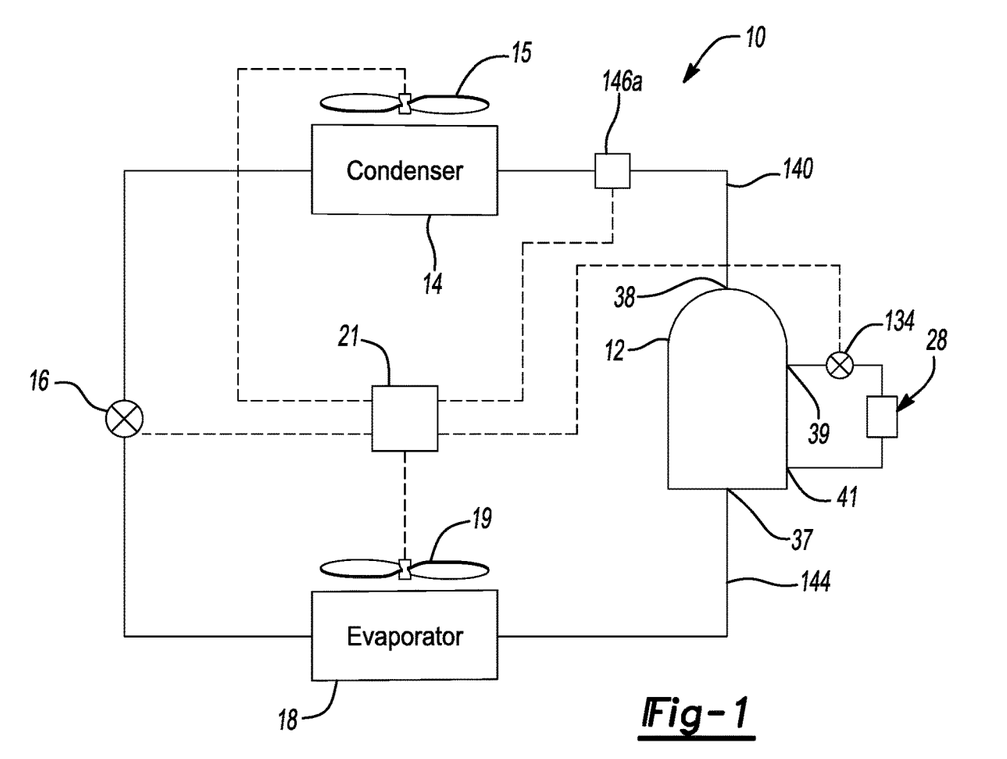
FIG. 1 is a schematic representation of an exemplary climate-control system according to the principles of the present disclosure.

With reference to FIG. 1, a climate-control system 10 is provided that may include a compressor 12, a first heat exchanger 14 (an outdoor heat exchanger such as a condenser or gas cooler, for example), an outdoor blower 15, an expansion device 16 (e.g., a thermal expansion valve, an electronic expansion valve, a capillary tube, etc.), a second heat exchanger 18 (an indoor heat exchanger such as an evaporator), an indoor blower 19 and a control module 21. The compressor 12 compresses working fluid (e.g., refrigerant, carbon dioxide, etc.) and circulates the working fluid throughout the system 10. In some configurations, the climate-control system 10 may be a heat-pump system having a reversing valve (not shown) operable to control a direction of working fluid flow through the system 10 to switch the system 10 between a heating mode and a cooling mode. In some configurations, the climate-control system 10 may be a chiller system, an air-conditioning system or a refrigeration system, for example, and may be operable in only the cooling mode. As will be described in more detail below, the control module 21 may control operation of one or more components of the system 10 (e.g., the compressor 12, blowers 15, 19, expansion device 16) to cool the compressor 12.

Figure 2:
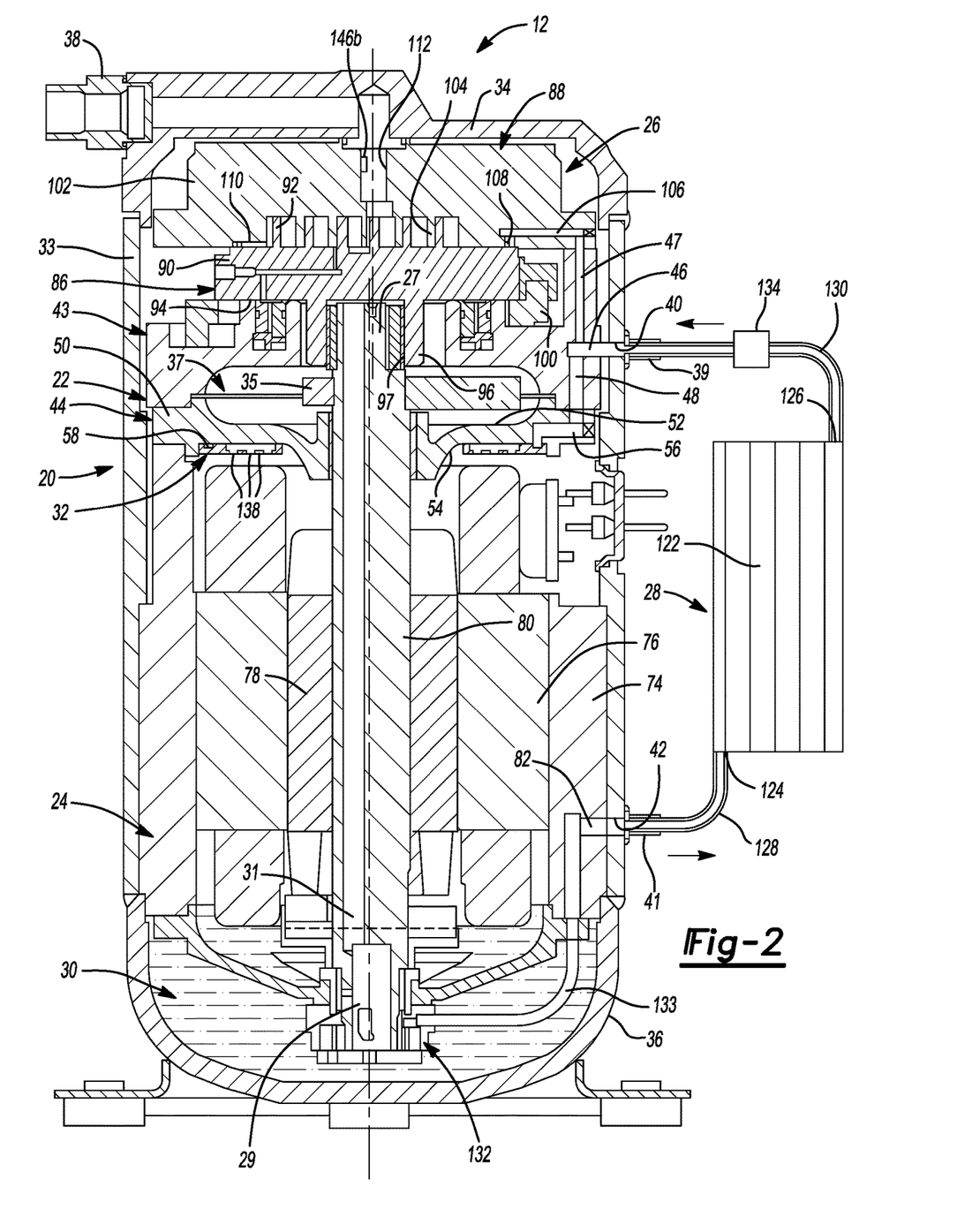
FIG. 2 is a cross-sectional view of the compressor of FIG. 1.

With reference to FIG. 2, the compressor 12 may include a shell assembly 20, a bearing housing assembly 22, a motor assembly 24, a compression mechanism 26, a third heat exchanger 28, an oil sump 30 and an oil distribution member 32. The shell assembly 20 defines an internal cavity housing the bearing housing assembly 22, the motor assembly 24, the compression mechanism 26, the oil sump 30, and the oil distribution member 32. The shell assembly 20 generally forms a compressor housing and may include a cylindrical shell 33, an end cap 34 at the upper end thereof and a base 36 at a lower end thereof. A discharge fitting 38 may extend through the shell assembly 20 at a first opening in the end cap 34. A suction fitting 37 (shown schematically in FIG. 1) may extend through the shell assembly 20 at a second opening (not shown) in the shell 33 or the end cap 34. A first oil fitting 39 may extend through the shell assembly 20 at a third opening 40 in the shell 33. A second oil fitting 41 may extend through the shell assembly 20 at a fourth opening 42 in the shell 33.

The bearing housing assembly 22 may include a thrust-bearing housing 43 and a main-bearing housing 44. The thrust-bearing housing 43 may be a generally annular member and may include an inlet passage 46, a first distribution passage 47 and a second distribution passage 48. The inlet passage 46 may extend radially into an outer portion of the thrust-bearing housing 43 and may be in fluid communication with the first oil fitting 39. The first and second distribution passages 47, 48 may be in fluid communication with the inlet passage 46 and may extend in opposite axial directions from the inlet passage 46. The first distribution passage 47 may have a smaller diameter than that of the second distribution passage 48.

The main-bearing housing 44 may include an outer portion 50, an upper recessed portion 52, and a lower recessed portion 54. A passage 56 may extend through the outer portion 50 and through to the lower recessed portion 54 and may be in fluid communication with the second distribution passage 48 and an oil-feed groove 58 of the oil distribution member 32.

The motor assembly 24 may be press-fitted into the shell assembly 20 and may include a stator housing 74, a stator 76, and a rotor 78, and a driveshaft 80. The stator housing 74 may engage the shell assembly 20 and may include a generally L-shaped oil passage 82 extending through a portion thereof and in fluid communication with the second oil fitting 41. The rotor 78 may selectively rotate the driveshaft 80 to cause corresponding movement of the compression mechanism 26.

The driveshaft 80 may include a crank pin 27, a concentric bore 29 and an eccentric bore 31. An upper counterweight 35 may be fixed to the driveshaft 80 at a location proximate to the crankpin 27 and rotates within a counter weight cavity 37. The concentric bore 29 and the eccentric bore 31 may be in fluid communication with the oil sump 30 such that rotation of the driveshaft pumps or draws oil from the oil sump 30, through the concentric bore 29, and along the eccentric bore 31, and to the compression mechanism 26 and various other components of the compressor 12 that require lubrication and cooling.

The compression mechanism 26 may generally include an orbiting scroll member 86 and a non-orbiting scroll member 88. The orbiting scroll member 86 may include an end plate 90 having a spiral wrap 92 disposed on an upper surface thereof and an annular thrust surface 94 disposed on a lower surface. A cylindrical hub 96 may project downwardly from the thrust surface 94 and may have a drive bushing 97 rotatively disposed therein. An Oldham coupling 100 may be keyed to the orbiting scroll member 86 and the thrust-bearing housing 43 or the non-orbiting scroll member 88 to prevent relative rotation between the orbiting scroll member 86 and the thrust-bearing housing 43 while allowing relative orbital motion between the orbiting scroll member 86 and the thrust-bearing housing 43.

The non-orbiting scroll member 88 may include an end plate 102 having a spiral wrap 104 on a lower surface thereof, an oil-supply passage 106, an oil groove 108 and an oil-injection passage 110. The spiral wrap 104 may meshingly engage the spiral wrap 92 of the orbiting scroll member 86, thereby creating a series of moving fluid pockets between the scroll members 86, 88. The fluid pockets created by the spiral wraps 92, 114 may decrease in volume as they move from a radially outer position to a radially inner position throughout a compression cycle of the compression mechanism 26.

The oil-supply passage 106 may extend radially through a portion of the end plate 102 of the non-orbiting scroll member 88 and may be in fluid communication with the first distribution passage 47 of the thrust-bearing housing 43. The oil groove 108 may be a generally annular groove extending circumferentially around the spiral wrap 104 and may be in fluid communication with the oil-supply passage 106 and the oil-injection passage 110. The oil-injection passage 110 may be in fluid communication with a radially outer one of the moving fluid pockets defined by the spiral wraps 92, 114. A discharge passage 112 may extend axially through the end plate 102 and may be in fluid communication with the discharge fitting 38.

The third heat exchanger 28 may include a coil 122 having an inlet 124 and an outlet 126. An inlet conduit or passageway 128 may be in fluid communication with the second oil fitting 41 and the inlet 124 while an outlet conduit or passageway 130 may be in fluid communication with the outlet 126 and the first oil fitting 39.

The oil sump 30 may be at least partially defined by the base 36 of the shell assembly 20 and may be filled with a fluid (e.g., a lubricant, such as oil or another fluid) to a predetermined level. An oil pump 132 may be disposed in the oil sump 30 and may be attached to a lower end of the driveshaft 80. The oil pump 132 may be fluidly coupled with the oil passage 82 of the stator housing 74 via a first conduit 133.

During operation of the motor assembly 24, the oil pump 132 may pump fluid from the oil sump 30 into the first conduit 133. From the first conduit 133, the fluid may flow through the oil passage 82 in the stator housing 74 and exit the shell assembly 20 through the second oil fitting 41. From the second oil fitting 41, the fluid may flow into the inlet 124 of the third heat exchanger 28 via the inlet conduit 128.

Fluid flowing through the third heat exchanger 28 may reject heat to ambient air, for example, before exiting the third heat exchanger 28 through the outlet 126 and flowing into the outlet conduit 130. A valve 134 (e.g., a solenoid valve) may be disposed along the outlet conduit 130 and may be movable between an open position in which fluid may be allowed to flow through the outlet conduit 130 and a closed position in which fluid from may be prevented from flowing through the outlet conduit 130.

From the outlet conduit 130, the fluid may enter the shell assembly 20 via the first oil fitting 39. From the first oil fitting 39, the fluid may flow through the inlet passage 46 in the thrust-bearing housing 43. From the inlet passage 46 a first portion of the fluid flowing therethrough may enter the first distribution passage 47 and a second portion of the fluid flowing through the inlet passage 46 may enter the second distribution passage 48.

In some configurations, the compressor 12 may not include the third heat exchanger 28, and therefore, a single conduit may be in fluid communication with the first and second oil fittings 39, 41. In this way, the valve 134 may be disposed along the single conduit and may open and close to selectively allow and restrict fluid through the single conduit. In some configurations where the third heat exchanger 28 is omitted, the valve 134 may be disposed along a conduit (e.g., a conduit connecting the oil pump 132 with the distribution passages 47, 48) disposed within the compressor 12 (i.e., in the shell assembly 20) instead of being external to the compressor 12.

Fluid in the first distribution passage 47 may flow into the oil-supply passage 106 of the non-orbiting scroll member 88. From the oil-supply passage 106, the fluid may enter the oil groove 108. A first portion of the fluid disposed in the oil groove 108 may leak between the end plates 90, 102 of the orbiting and non-orbiting scroll members 86, 88, respectively. A second portion of the fluid disposed in the oil groove 108 may enter the oil-injection passage 110 and flow into one of the moving fluid pockets of the compression mechanism 26. In this manner, the fluid cools the orbiting and non-orbiting scroll members, 86, 88 while maintaining adequate lubrication between the orbiting and non-orbiting scroll members 86, 88. In some configurations, the fluid may be directed to other locations of the compression mechanism 26 in addition to, or instead of, flowing into one of the moving fluid pockets of the compression mechanism 26.

Fluid in the second distribution passage 48 may flow into the passage 56 extending through the main-bearing housing 44. From the passage 56, fluid may flow into the oil-feed groove 58 of the oil distribution member 32. Fluid may flow throughout the oil-feed groove 58 of the oil distribution member 32 and may flow into a plurality of oil-drain holes 138 (via a plurality of oil feed channels (not shown)) extending through the oil distribution member 32. The oil-drain holes 138 extend through the oil distribution member 32 such that fluid entering the oil-drain holes 138 will drip and/or flow onto the stator 76 and/or rotor 78 of the motor assembly 24. Because the fluid dripping and/or flowing onto the stator 76, rotor 78, and/or other components of the motor assembly 24 has been cooled in the third heat exchanger 28, the fluid is effective in cooling the stator 76, rotor 78, and/or other components of the motor assembly 24.

Referring now to FIG. 1, the first heat exchanger 14 may be in fluid communication with the compressor 12 and may receive compressed working fluid from a discharge line 140 that is in fluid communication with the discharge fitting 38 of the compressor 12. The first heat exchanger 14 may transfer heat from the compressed working fluid to ambient air that may be forced over the first heat exchanger 14 by the outdoor blower 15. In some configurations, the first heat exchanger 14 may transfer heat from the compressed working fluid to a stream of liquid such as water, for example. From the first heat exchanger 14, the working fluid may flow through the expansion device 16 (e.g., a thermal expansion valve, electronic expansion valve or capillary tube), thereby lowering the temperature and pressure of the working fluid. From the expansion device 16, the working fluid may flow into the second heat exchanger 18.

The working fluid in the second heat exchanger 18 may absorb heat from air that may be forced over the second heat exchanger 18 by the indoor blower 19. From the second heat exchanger 18, the working fluid may flow through a suction line 144 and into the compressor 12 (via the suction fitting (not shown)) where the working fluid is compressed by the compression mechanism 26.

Figure 3:
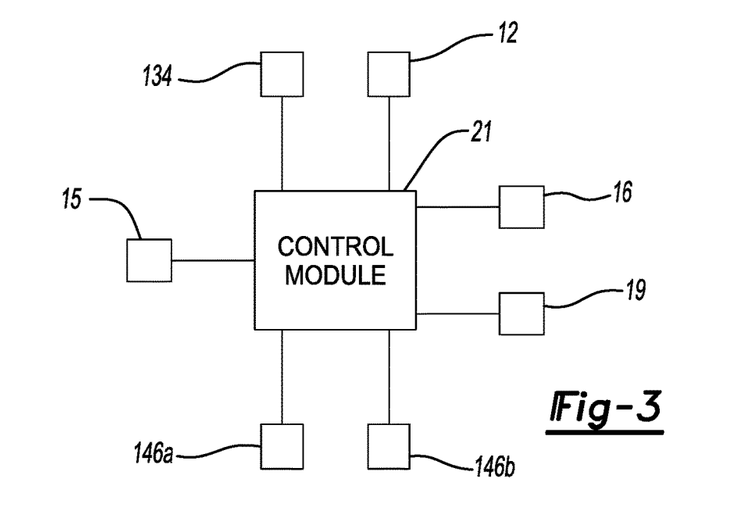
FIG. 3 is a block diagram illustrating communication between a control module and components of the climate-control system of FIG. 1.

As shown in FIG. 3, the control module 21 may be in communication with the compressor 12 (e.g., the motor assembly 24), the blowers 15, 19, the valve 134 and the expansion device 16, for example. The control module 21 may also be in communication with one or more sensors including, for example, one or both of a first sensor 146a (FIGS. 1 and 3) and a second sensor 146b (FIGS. 2 and 3). The first and second sensors 146a, 146b may be temperature sensors or pressure sensors, for example. The first sensor 146a may measure a temperature or pressure of compressed working fluid that has been discharged from the compressor 12 and communicate that data to the control module 21. In some configurations, the sensor 146a may be disposed along the discharge line 140 (as shown in FIG. 1) through which working fluid flows from the compressor 12 to the first heat exchanger 14. In other configurations, the sensor 146a may be disposed along a coil of the first heat exchanger 14 and may measure evaporating temperature or pressure.

The second sensor 146b may measure a temperature or pressure of fluid in the discharge passage 112 of the non-orbiting scroll member 88 and communicate that data to the control module 21. It should be also understood that other sensors may be located at other various locations within the system 10 (e.g., sensors embedded within the scroll members 86, 88).

As described above, the control module 21 may control operation of one or more components of the system 10 to cool the scroll members 86, 88 of the compressor 12. In some configurations, the control module 21 may communicate with another control module (not shown), which may control operation of the one or more components of the system 10 to cool the scroll members 86, 88 of the compressor 12. For example, the control module 21 may be located on the compressor 12 and may communicate with a system controller at a remote location to control operation of the one or more components of the system 10 to cool the scroll members 86, 88 of the compressor 12.

Figure 4:
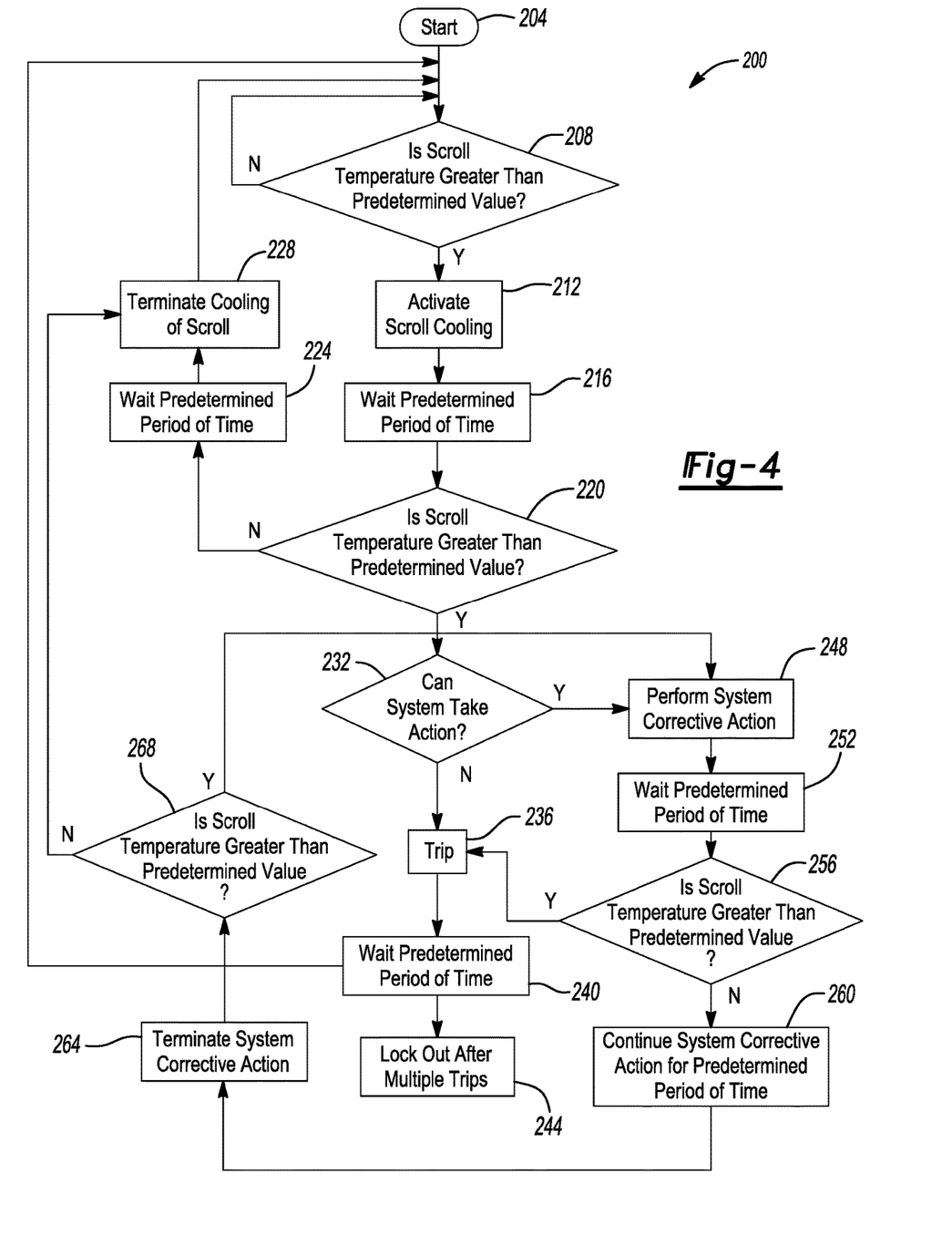
FIG. 4 is a flowchart depicting an algorithm for cooling a compression mechanism of the compressor.

FIG. 4 illustrates an exemplary scroll-cooling process 200. The process 200 begins at block 204. At step 208 of the process 200, the control module 21 may acquire (e.g., measure, calculate or look up) a first value of an operating parameter and determine if the first value of the operating parameter is greater than a predetermined parameter value (e.g., a predetermined temperature value). The operating parameter may be a parameter (e.g., a temperature or pressure) that is indicative of a temperature of the compression mechanism 26 (e.g., a temperature of the orbiting scroll member 86 and/or the non-orbiting scroll member 88). For example, the operating parameter could be a discharge temperature or pressure (e.g., a temperature or pressure of working fluid at a discharge passage of the compression mechanism 26 or at the discharge line 140) or a temperature of a surface of the non-orbiting scroll member 88. The first value of the operating parameter may be measured by the sensor 146a and/or the sensor 146b and communicated to the control module 21. In some configurations, the first value of the operating parameter may be measured by one or more sensors located at other locations of the system 10 (e.g., embedded in one or both of the scroll members 86, 88).

In some configurations, the first value of the operating parameter may be calculated or determined from a lookup table or map based on operating conditions of the compressor 12 or system 10. For example, the operating parameter could be a suction superheat (i.e., difference between the saturated temperature of the working fluid in the suction line 144 and the actual temperature of the working fluid in the suction line 144).

If the control module 21 determines at step 208 that the first value of the operating parameter is less than the predetermined parameter value, the control module 21 may maintain the valve 134 in the closed position. If the control module 21 determines at step 208 that the first value of the operating parameter is greater than the predetermined parameter value, the control module 21 may, at step 212, activate cooling of the scroll members 86, 88. To activate cooling of the scroll members 86, 88, the control module 21 may cause the valve 134 to move toward the open position to increase the flow of lubricant from the oil sump 30 to the compression mechanism 26 (e.g., via oil-supply passage 106), as described above. In some configurations, activating cooling of the scroll members 86, 88 may include the control module 21 starting a pump (i.e., a pump disposed within the oil sump 30, for example, and operable independent of the driveshaft 80) instead of, or in addition to, causing the valve 134 to move toward the open position. Thereafter, at step 216, the control module 21 may hold the valve 134 in the open position for a predetermined time period (e.g., 30 seconds, 1 minute or any other suitable time period) to ensure that the scroll members 86, 88 are being cooled.

At step 220, the control module 21 may acquire a second value of the operating parameter and determine if the second value is greater than the predetermined parameter value. The second value may be acquired in a similar or identical manner as described above with the first value.

If the control module 21 determines that the second value is less than the predetermined parameter value, the control module 21 may, at step 224, continue cooling the scroll members 86, 88 for a predetermined time period (e.g., 30 seconds, 1 minute or any other suitable time period). Thereafter, at step 228, the control module 21 may terminate cooling of the scroll members 86, 88 by moving the valve 134 to the closed position. The process 200 may be repeated continuously or at predetermined time intervals or if and when the control module 21 determines that a value of the operating parameter is greater than the predetermined parameter value.

If the control module 21 determines that the second value of the operating parameter is greater than the predetermined parameter value, the control module 21 may, at step 232, determine if the system 10 can take one or more system corrective actions. A corrective action could include, for example, (a) adjust a position of the expansion device (i.e., if the expansion device 16 is a controllable expansion device such as an electronic expansion valve (EXV) as oppose to a fixed orifice or a thermal expansion valve (TXV), for example), and/or (b) adjust the speed of one or both of the blowers 15, 19 (i.e., if the blowers 15, 19 are variable-speed blowers as opposed to fixed-speed blowers), and/or (c) adjusting the compressor motor speed and/or capacity modulation.

If the control module 21 determines that the system 10 cannot take system correction action, the control module 21 may, at step 236, trip a motor protector to temporarily disable the compressor 12. Thereafter, at step 240, the control module 21 may wait a predetermined period of time to allow the scroll members 86, 88 to cool off before restarting the compressor 12 and repeating the process 200 at the predetermined time interval or if and when a parameter value indicating the temperature of the scroll members 86, 88 is greater than the predetermined parameter value. If multiple trips occur, the control module 21 may, at step 244, lockout the compressor 12 to prevent permanent damage to the scroll members 86, 88.

If the control module 21 determines that the system 10 can take system corrective action, the control module 21 may, at step 248, communicate to the system 10 to perform a system corrective action.

In some configurations, the system corrective action may include decreasing superheat (i.e. temperature of working fluid entering the compressor 12—evaporator saturation temperature) to the compressor 12. This is done by using the control module 21 to adjust the expansion device 16 (i.e. electronic expansion valve) such that working fluid flow therethrough is increased. In this way, the superheat is decreased, thereby cooling the scroll members 86, 88. In some configurations, the system corrective action may include increasing the speed of the blower 15 across the first heat exchanger 14 (or the blower 19 across the second heat exchanger 18 when the system 10 is in the heating mode). In this way, the transfer of heat from the compressed working fluid to ambient air is increased, which slightly decreases the load on the scroll members 86, 88, thereby reducing the temperature of the scroll members 86, 88. In some configurations, the system corrective action may include controlling liquid floodback (i.e., liquid working fluid flowing into the suction line 144 from the second heat exchanger 18) to the compressor 12. This is done by monitoring the temperature of the discharge line 140 (via the sensor 146a) and controlling the expansion device 16 (i.e., electronic expansion valve) to control the amount of liquid floodback to the compressor 12, which cools the scroll members 86, 88. It should be understood that other system corrective actions make be taken to cool the scroll members 86, 88.

At step 252, the control module 21 may continue performing the system cooling action for a predetermined time period (e.g., 30 seconds, 1 minute or any other suitable time period). Thereafter, the control module 21 may, at step 256, determine if a third value of the operating parameter is greater than the predetermined parameter value. The third value may be acquired in a similar or identical manner as described above.

If the control module 21 determines that the third value of the operating parameter is greater than the predetermined parameter value, the control module 21 may, at step 236, trip a motor protector to temporarily disable the compressor 12.

If the control module 21 determines that the third value of the system 10 is less than the predetermined parameter value, the control module 21 may, at step 260, continue the system corrective action for a predetermined time period (e.g., 30 seconds, 1 minute or any other suitable time period). Thereafter, at step 264, the control module 21 may terminate system corrective action.

At step 268, the control module 21 may determine if a fourth value of the operating parameter is greater than the predetermined parameter value. The fourth parameter value may be acquired in a similar or identical manner as described above.

If the control module 21 determines that the fourth value of the operating parameter is greater than the predetermined parameter value, the control module 21 may, at step 248, perform a system corrective action. If the control module 21 determines that the fourth value of the operating parameter is less than the predetermined parameter value, the control module 21 may, at step 228, terminate cooling of the scroll members 86, 88 (i.e., move the valve 134 to the closed position).

One benefit of the scroll-cooling process 200 of the present disclosure is that cooling is provided only when required, which improves reliability of the compressor 12 by limiting periods of higher oil carry over outside of the shell and may expand the operating envelope (i.e., set of system conditions in which the compressor 12 is allowed to operate with accepted reliability) of the compressor 12. Another benefit of the scroll-cooling process 200 of the present disclosure is that the process 200 can be employed at any motor speed (e.g., high speed, low speed, etc.) as oppose to being limited by a particular motor speed. It should be also understood that the control module 21 may issue a fault warning such as blinking fault codes or other notification measures when the measured temperature values are above the predetermined value or when the compressor 12 trips, for example.

While the compressor 12 is described above as being a scroll compressor, it will be appreciated that the principles of the present disclosure are applicable to other types of compressors. For example, the compression mechanism 26 of the compressor 12 could be a reciprocating compression mechanism (e.g., including a piston that reciprocates within a cylinder), a rotary vane compression mechanism (e.g., including a rotor that orbits within a cylinder, or a screw compression mechanism (e.g., including a pair of intermeshed screws), for example.

In this application, including the definitions below, the term "module" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The descriptions above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method comprising:
   acquiring a first value of an operating parameter that is indicative of a temperature of a compression mechanism of a compressor, wherein the compression mechanism includes a first scroll and a second scroll, wherein the first scroll includes a first spiral wrap, and wherein the second scroll includes a second spiral wrap that meshes with the first spiral wrap;
   comparing the first value to a predetermined parameter value;
   providing lubricant from an oil sump of the compressor to the compression mechanism of the compressor via a first fluid passageway if the first value is greater than the predetermined parameter value;
   providing the lubricant from the oil sump of the compressor to a motor assembly of the compressor via the first fluid passageway if the first value is greater than the predetermined parameter value;
   providing the lubricant from the oil sump to the compression mechanism via a second passageway formed in a driveshaft of the compressor; and
   restricting lubricant from the oil sump to the compression mechanism via the first fluid passageway if the first value is less than the predetermined parameter value,
   wherein the first fluid passageway provides the lubricant to the first and second scrolls of the compression mechanism at a location that is radially outside of the first and second spiral wraps,
   wherein a portion of the first fluid passageway is disposed outside of a shell assembly of the compressor, and
   wherein the first fluid passageway is coupled with a first passage in a bearing housing of the compressor, and wherein the first passage provides the lubricant to the location.

2. The method of claim 1, wherein the operating parameter is a temperature of a discharge line of a climate-control system.

3. The method of claim 1, wherein the operating parameter is a temperature of a discharge passage of the compression mechanism.

4. The method of claim 1, wherein providing the lubricant to the compression mechanism includes opening a valve, and wherein restricting the lubricant to the compression mechanism includes closing the valve.

5. The method of claim 1, further comprising:
   acquiring a second value of the operating parameter; and
   determining if the second value is greater than the predetermined parameter value.

6. The method of claim 5, wherein a predetermined time period elapses between providing the lubricant from the oil sump to the compression mechanism and acquiring the second value of the operating parameter if the first value is greater than the predetermined parameter value.

7. The method of claim 5, further comprising shutting down the compressor if the second value is greater than the predetermined parameter value.

8. The method of claim 5, further comprising performing a system corrective action if the second value is greater than the predetermined parameter value, wherein the system corrective action includes one or both of: adjusting a position of an expansion device and adjusting a speed of a blower motor.

9. The method of claim 1, wherein the operating parameter is a suction superheat.

10. The method of claim 1, wherein the first fluid passageway is coupled with a second passage in the bearing housing, and wherein the second passage provides the lubricant to the motor assembly.

11. The method of claim 10, wherein the first fluid passageway provides the lubricant to a compression pocket defined by the first and second spiral wraps.

12. The method of claim 1, wherein the first passage in the bearing housing provides the lubricant to a supply passage that extends radially through a portion of an end plate of the first scroll, and where the supply passage is disposed radially outward relative to the first and second spiral wraps and provides the lubricant to the location.

* * * * *